Nov. 28, 1967 — J. E. SADLER — 3,355,229
COTTON PICKER BAR PIVOT LUBRICATING MEANS
Filed Aug. 16, 1965
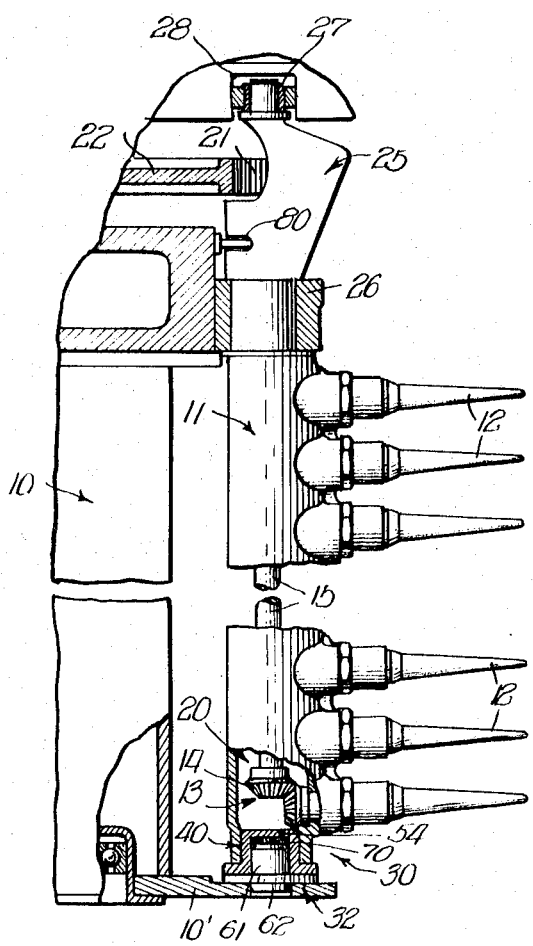
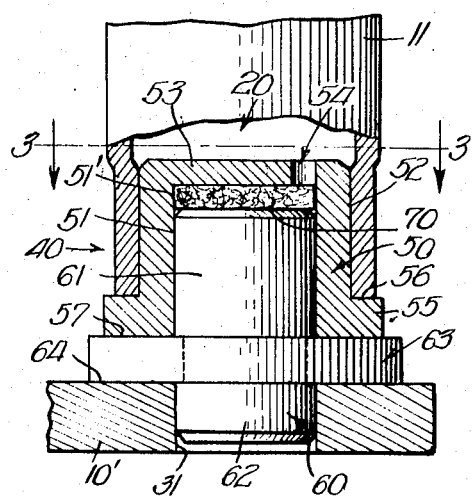
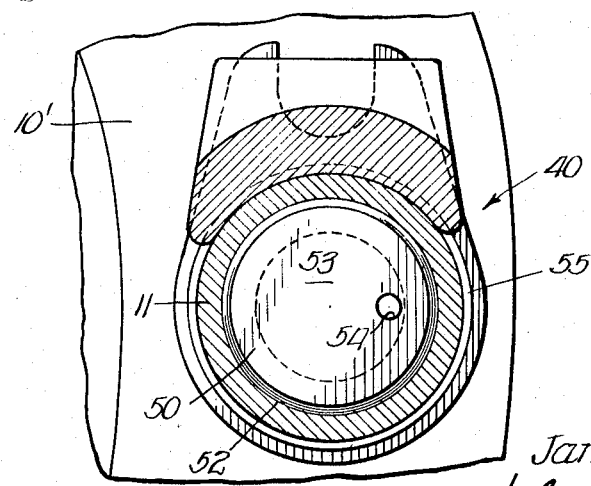
Inventor:
James E. Sadler,
By John J. Kowalik

United States Patent Office 3,355,229
Patented Nov. 28, 1967

3,355,229
COTTON PICKER BAR PIVOT LUBRI-
CATING MEANS
James E. Sadler, 3317 Park Ave.,
Memphis, Tenn. 38111
Filed Aug. 16, 1965, Ser. No. 479,755
11 Claims. (Cl. 308—78)

ABSTRACT OF THE DISCLOSURE

A lower pivot bearing assembly rotatably mounting a spindle bar comprising a cup shaped bushing with a top wall sealing the lower end of a base in the bar and having a lubricant port the bushing having a chamber, a mounting pin in the chamber, and a lubricant distributor in the chamber communicating with the port.

---

This invention generally relates to novel means for lubricating the spindle bar pivot of a cotton harvester, and more particularly relates to a new bearing assembly for the lower pivot of a cotton harvester spindle bar.

As shown in United States Patent 2,743,569, the periphery of the picking drum or rotor of cotton harvesters in current production includes a series of horizontally extending picking spindles spaced along vertical spindle-carrying bars. A plurality of these vertical spindle bars are rotatably mounted around the periphery of the drum in such type of cotton harvester, and each such bar is generally tubular in configuration to define a central bore for housing a gear train mechanism which rotates the picking spindles thereon about the individual spindle axes. In addition, the lowermost end of each spindle bar in the cotton harvester under consideration is rotatably mounted to the base of the picking drum so that the spindle bar may revolve about a vertical axis with respect to the picking drum during the harvesting operation.

It is well known that these lower pivots for the spindle bars are subjected to severe wear during the harvesting operation, and are positioned in a location on the harvester which subjects the pivot to damage from accumulated bar trash such as dirt, plant matter and small metallic filings from the spindle gear train. Hence, a constant and reoccurring problem in this type of cotton harvester has been the provision of means to adequately lubricate this lower spindle bar pivot and to screen foreign matter away from the pivot.

It is thus the principal object of this invention to provide novel means for lubricating the lower spindle bar pivot on a cotton harvester picking drum.

It is a further object of this invention to provide a novel bearing assembly for rotatably mounting the lower end of a spindle bar to the base of a cotton harvester picking drum.

It is still a further object of this invention to provide a novel bearing assembly for the lower pivot of a cotton harvester spindle bar which allows the pivot to be adequately lubricated, and which filters out foreign matter from the pivot, thus substantially prolonging the service life of the pivot.

It is an additional object of this invention to provide a novel bearing assembly for the lower pivot of a cotton harvester spindle bar which may be readily installed by known manufacturing methods without requiring substantial alteration of the harvester components.

More specific objects and features of this invention will become apparent from a description of an embodiment thereof, as illustrated in the accompanying drawing. In the drawing:

FIGURE 1 is an elevational view in partial section of the picker drum of a cotton harvester of the type under consideration showing the spindle-carrying bars provided with a lower pivot bearing assembly in accordance with this invention;

FIGURE 2 is an enlarged fragmentary view of the improved bearing assembly for the lower pivot of the spindle-carrying bar as shown in FIGURE 1, and FIGURE 3 is a cross section view taken along the line 3—3 in FIGURE 2.

Referring initially to FIGURE 1 of the drawing, the picker drum of the harvester, generally designated by the numeral 10, is positioned on the harvester for rotation about a vertical drum axis, not shown, and includes a plurality of spindle bars 11 vertically mounted on the peripheral portion of the drum. These bars 11 are provided with continuous vertical bores 20, and carry a series of vertically spaced and horizontally extending picking spindles 12 which are designed to engage with the bolls on the cotton plants and collect the cotton therefrom during the harvesting operation. United States Patent 2,743,569 more fully describes that these picking spindles 12 are rotated about their individual spindle axes by a gear train mechanism 13 comprising bevel gears 14 positioned along the shaft 15. As illustrated in FIGURE 1, this shaft 15 is housed within the hollow bore 20 of the spindle bar 11, and is rotated during the harvesting operation by the engagement of pinion 21 with driven gear 22.

To position the spindle bar 11 on the drum 10, the upper portion 25 of the spindle bar is supported on the drum by a bearing 26, and the lower end 30 of spindle bar 11 is rotatably connected to the base plate 10' of the picking drum 10 by a lower pivot, generally indicated as 32. The upper portion 25 of the spindle bar 11 is further provided with an eccentrically-positioned cam roller 27 operably engaged with the cam groove 28 on the harvester drum 10 to rotate the bar 11 about a vertical axis and maintain the spindles 12 thereon in proper picking position throughout the cotton harvesting operation.

From the above description of the positioning of the spindle bar 11 on the cotton harvesters under consideration, it is apparent that the lower bar pivot 32 is thus subjected to a multitude of adverse conditions and forces during the harvesting operation. For instance, the pivot 32 is not only vulnerable to damage from accumulated bar trash such as dirt and the like, but must maintain the spindle bar 11 in proper alignment while being subjected to forces resulting from the simultaneous rotation of the drum, 10, the spindles 12 and the spindle bar itself.

In accordance with this invention, the lower spindle bar pivot 32 is thus provided with a novel bearing assembly 40 which permits the lower pivot to be adequately lubricated and which protects this pivot from damage by foreign matter and the like resulting from the cotton harvesting operation.

The enlarged representation of FIGURE 2 clearly illustrates that this novel bearing assembly 40 in accordance with this invention includes a bushing member 50. This bushing 50 is preferably made from a lubricant-permeable material such as powdered sintered metal, and is substantially cylindrical in cross-section and cup-shaped in configuration. Bushing 50 thereby defines an accurately dimensioned cylindrical inner chamber 51, and an accurately dimensioned peripheral outer portion 52. As seen in FIGURE 2, this outer portion 52 of the bushing 50 is dimensioned for placement within the lower end of the bore 20 provided in the spindle bar 11 in a manner, such as by a press fitting or swaging, which prevents relative movement between the bushing 50 and the spindle bar 11, and which prevents the lubrication from leaking out of the bearing assembly between the bushing and the spindle.

As also shown in FIGURE 2 of the drawing, the bushing 50 includes a top portion 53 which substantially seals the lower end of the spindle bar 11 when the bushing is press-fit therein. By this arrangement, any lubricant fluid retained within the bore 20 of the spindle bar cannot readily leak out through this lower pivot and foreign matter cannot readily enter the bearing assembly, as was heretofore possible. Instead, in accordance with this invention, the bore 20 of the spindle bar 11, which defines a lubricating fluid reservoir, is in communication with the inner chamber 51 of this bushing 50 only by means of a small aperture or lubricant port 54 provided in the top portion 53 of the bushing. This lubricant port 54 is of limited dimension to provide for a metered or regulated flow of lubricant from the reservoir defined by bore 20 to inner chamber 51, and may be positioned at any desired lateral location along the top portion 53 of this bushing. However, port 54 is preferably located adjacent to one side of the bushing 50 so that it will be subjected to a larger volume of lubricant during the harvesting operation, as described in more detail hereinafter.

As further shown in FIGURE 2, the lower portion of the bushing member 50 in this embodiment is provided with a laterally extending circular flange 55 defining an upper surface 56 for abutment against the lower end of the spindle bar 11, and defining a substantially flat surface 57 which provides a smooth lower bearing surface for the bushing and spindle bar.

In accordance with this invention, the bearing assembly further includes mounting member 60 for rotatably joining the spindle bar 11, including the bushing 50, to the base plate 10' of the picking drum. This member 60 is also preferably made from lubricant-permeable material such as sinter powdered metal, and in this embodiment comprises a mounting pin including accurately dimensioned upper and lower pivot pin portions 61 and 62, respectively, which are separated by a flat bearing plate 63.

As seen in FIGURES 1 and 2 of these drawings, the lower pivot pin portion 62 of the mounting member 60 thus may be joined to the drum base plate 10', such as by press-fitting within the aperture 31, in a manner which brings the lower surface 64 of bearing plate 63 into abutment with the drum plate and which prevents relative movement between the drum 10 and the mounting member 60. The upper pivot pin portion 61 is thus retained in an upright position on drum 10 for extension within chamber 51 of the bushing 50 when bearing 40 is assembled, and the diameter of pin portion 61 is dimensioned to a close tolerance so that the bushing 50 and spindle bar 11 will rotate with respect to the drum about this upper pin.

It is also a feature of this invention to provide the bearing assembly with lubricant distributing means within chamber 51 in communication with the port 54 which will uniformly distribute the lubricant throughout the bearing. The length of pin portion 61 in this embodiment is therefore made less than the depth of chamber 51 of the bushing so that when this bearing 40 is assembled with the bearing surface 57 in abutment with bearing plate 53, the remaining space between pin portion 61 and top portion 53 of the bushing defines a cavity 51' of limited depth in the upper end of the chamber 51. Lubricant flowing into the bushing 50 through port 54 can therefore fill this cavity 51' and become evenly distributed throughout the bearing assembly. As seen from FIGURE 2, this embodiment of this invention is further provided with a distributor pad 70, preferably made of a dense felt material, which is retained above the pin 61 within the cavity 51'. By this arrangement, the distributor pad 70 functions as a wick for the lubricant and insures that the lubricating oil is evenly distributed to the wearing surfaces of the bearing assembly. In addition, it is apparent that the positioning of this distributor pad 70 allows the pad to further function as a filter or trap to screen the lubricating fluid and prevent foreign matter such as dirt and the like from coming into contact with the wearing surfaces of this novel bearing assembly.

Although not limited thereto, the novel bearing assembly of this invention has been found particularly suitable for use with the flush-type spindle lubricating system as described and claimed in the above-mentioned Patent 2,743,569. When employing this system, the oil will be injected into the bore 20 through the lubricant nozzle 80, shown in FIGURE 1. As more fully described in said patent, the oil will then migrate out of the bore 20 through the lubricant-permeable bearing means, not shown, which are provided for each of the spindles 12 of the spindle bar 11. After such migration, a small column of lubricating oil will remain within the reservoir defined by the lowermost end 30 of the bar 11 directly above the top portion 53 of bushing 50, and will be an adequate supply of oil to provide continuous lubrication to the bearing assembly 40.

The oil thus retained within the bore 20 of spindle bar 11, by using the lubrication system of Patent 2,743,569, or by another suitable method, will continuously flow into the bearing assembly 40 through the lubricant port 54 during the operation of the harvester. The diameter of port 54 is selected to provide the desired metered or regulated oil flow into the bearing assembly, and the port 54 is preferably positioned laterally adjacent to the radial outward side of the spindle bar 11. By this preferred arrangement, the rotation of the picking drum 10, which forces the oil column within bore 20 radially outward by centrifugal action, will function to pump the lubricating oil downwardly through the port 54 under a substantial pressure. The oil flowing through port 54 will then saturate the distributor pad 70, and will be uniformly distributed by this pad to the wearing surfaces of the bearing assembly between the upper pin portion 61 and the bushing 50, and between the bearing surface 57 and the bearing plate 63.

In addition to uniformly distributing the oil throughout the bearing assembly, the saturation of pad 70 with oil provides the bearing assembly with continuous lubrication during the normal operating period of the cotton harvester, and the pad 70 further functions as a filter or trap to collect bar trash such as dirt and metal gear filings. The bearing assembly as above described therefore prolongs the service life of the lower pivot of a cotton harvester spindle bar by providing the pivot with continuous lubrication and by protecting the pivot from foreign matter accumulated within the spindle bar during the harvesting operation.

Furthermore, it is apparent from the above description that this bearing assembly 40 may be readily installed on the harvester by securing the bushing 50 with the pad 70 to the spindle bar 11, securing the mounting member 60 to the drum plate 10', and then bringing the spindle bar and drum plate together to insert the upper pin portion 61 of the mounting member into the bushing.

The bearing assembly in accordance with this invention may therefore be assembled by known manufacturing methods without substantially altering the components of the harvester which cooperate with the bearing assembly.

The foregoing description is merely illustrative of the preferred embodiment of the lower pivot bearing assembly in accordance with this invention. It should be understood that various modifications in the structural and functional features of this bearing assembly may be devised by those skilled in the art without departing from the scope of this invention, as set forth in the accompanying claims.

What is claimed is:

1. In a cotton harvester having a rotatable picking drum including a spindle bar provided with a central bore defining a lubricating fluid reservoir, a lower pivot bearing assembly for rotatably mounting the lower end of said spindle bar to said drum, said bearing assembly comprising:

a cup shaped bushing secured within said bore in the lower end of said spindle bar and defining a cylindrical chamber for the receipt of a mounting pin, said bushing including a top portion extending laterally across said bore substantially sealing the lower end of said bar and further including a lubricant port to bring said reservoir into communication with said chamber and to permit a metered flow of lubricating fluid to enter said chamber from said reservoir, a mounting pin extending upwardly into said chamber and joined to said drum to rotatably mount said spindle bar on said drum, and lubricating distributing means in communication with said lubricant port within said chamber to distribute the lubricating fluid uniformly throughout said chamber.

2. In a cotton harvester having a rotatable picking drum including a spindle bar provided with a central bore defining a lubricating fluid reservoir, a lower pivot bearing assembly for rotatably mounting the lower end of said spindle bar to said drum, said bearing assembly comprising:

a cup shaped bushing secured within said bore in the lower end of said spindle bar and defining a cylindrical chamber for the receipt of a mounting pin, said bushing including a top portion extending laterally across said bore substantially sealing the lower end of said bar and further including a lubricant port in said top portion to bring said reservoir into communication with said chamber and to permit a metered flow of lubricating fluid to enter said chamber from said reservoir, a mounting pin extending upwardly into said chamber and joined to said drum to rotatably mount said spindle bar on said drum, and a distributor pad positioned within said chamber between said top portion of said bushing and said mounting pin and in communication with said port to filter foreign matter from said lubricating fluid and to uniformly distribute the fluid throughout said assembly.

3. The invention according to claim 2 wherein said lubricant port is positioned laterally on said top portion of said bushing adjacent to the outward side of said spindle bar whereby the rotation of said drum and said spindle pumps lubricating fluid through said port under a substantial pressure.

4. The invention according to claim 2 wherein said distributor pad comprises a layer of dense felt-like material.

5. The invention according to claim 2 wherein said bushing and said pin are made of lubricant-permeable sintered powdered metal.

6. In a cotton harvester having a rotatable picking drum including a spindle bar provided with a central bore defining a lubricating fluid reservoir, a lower pivot bearing assembly for rotatably mounting the lower end of said spindle bar to said drum, said bearing assembly comprising:

a cup shaped lubricant-permeable bushing secured within said bore in the lower end of said spindle bar and defining a cylindrical chamber for the receipt of a mounting pin, said bushing including a top portion extending laterally across said bore substantially sealing the lower end of said bar and having a transverse flange adjacent the bottom portion of said bushing defining a substantially flat bearing surface for said spindle bar, said bushing further including a lubricant port in said top portion to bring said reservoir into communication with said chamber and to permit a metered flow of lubricating fluid to enter said chamber from said reservoir, a lubricant-permeable mounting pin extending upwardly into said chamber and joined to said drum to rotatably mount said spindle bar on said drum, said pin including a laterally extending bearing plate positioned between said drum and said spindle bar and in sliding engagement with said bearing surface on said bottom portion of said bushing, and a distributor pad positioned within said chamber between said top portion of said bushing and said mounting pin and in communication with said port to filter foreign matter from said lubricating fluid and to uniformly distribute the fluid throughout said assembly.

7. A lower pivot bearing assembly rotatably mounting a spindle bar having a central bore, said bearing assembly comprising:

a cup shaped bushing within said bore in the lower end of said spindle bar and defining a cylindrical chamber, said bushing including a top portion to substantially seal the lower end of said bar and further including a lubricant port to permit a metered flow of lubricating fluid to enter from said bore to said chamber, a mounting pin having an upper end retained within said chamber for rotation with respect to said bushing, and lubricant distributing means in communication with said port within said chamber for distributing lubricating fluid substantially uniformly throughout said chamber.

8. A lower pivot bearing assembly for rotatably mounting a cotton harvester spindle bar having a central bore to a cotton harvester drum, said bearing assembly comprising:

a cup shaped bushing having an outer peripheral portion for engagement within said bore in the lower end of said spindle bar and having an inner surface portion defining a cylindrical chamber for the receipt of a mounting pin, said bushing including a top portion to substantially seal the lower end of said bar and further including a lubricant port in said top portion to permit a metered flow of lubricating fluid to enter said chamber therethrough, a mounting pin having an upper end retained within said chamber in sliding contact with said inner surface portion of said bushing for rotation with respect to said bushing and having a lower end for joining said pin to said drum to rotatably mount said spindle bar on said drum, and a distributor pad positioned within said chamber between said top portion of said bushing and said mounting pin and in communication with said port to filter foreign matter from the lubricating fluid entering said chamber and to distribute the fluid uniformly throughout said bearing assembly.

9. A lower pivot bearing assembly according to claim 8 wherein said distributor pad comprises a layer of felt-like material.

10. A lower pivot bearing assembly according to claim 8 wherein said bushing includes a transverse flange adjacent the bottom portion thereof defining a substantially flat bearing surface for said spindle bar and wherein said mounting pin includes a laterally extending bearing plate positioned intermediate the ends thereof for sliding engagement with said bearing surface on said bottom portion of said bushing.

11. The invention according to claim 8 wherein said bushing and said pin are made of lubricant-permeable sintered powdered metal.

References Cited

UNITED STATES PATENTS

| 541,303 | 6/1895 | Whitney | 308—172 |
|---|---|---|---|
| 1,660,939 | 2/1928 | Snow. | |
| 1,817,892 | 8/1931 | Claus. | |
| 2,418,313 | 4/1947 | Morley | 308—172 |
| 2,684,272 | 7/1954 | Annen. | |

MARTIN P. SCHWADRON, *Primary Examiner.*

FRANK SUSKO, *Assistant Examiner.*